United States Patent
Chang et al.

(10) Patent No.: US 11,429,798 B2
(45) Date of Patent: Aug. 30, 2022

(54) WIRELESS TAG LOCATION SYSTEM AND METHOD THEREOF

(71) Applicant: InnoLux Corporation, Miao-Li County (TW)

(72) Inventors: Chin-Hung Chang, Miao-Li County (TW); Yi-Sheng Lin, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/988,721

(22) Filed: Aug. 10, 2020

(65) Prior Publication Data

US 2022/0043988 A1 Feb. 10, 2022

(51) Int. Cl.
| | |
|---|---|
| *G06K 7/10* | (2006.01) |
| *H04W 4/33* | (2018.01) |
| *H04B 17/318* | (2015.01) |
| *H04W 4/021* | (2018.01) |

(52) U.S. Cl.
CPC ..... *G06K 7/10099* (2013.01); *G06K 7/10029* (2013.01); *G06K 7/10306* (2013.01); *H04B 17/318* (2015.01); *H04W 4/021* (2013.01); *H04W 4/33* (2018.02)

(58) Field of Classification Search
CPC ........... G06K 7/10099; G06K 7/10306; G06K 19/0723; G06K 7/10475; G06K 19/06028; H04W 4/33; H04W 4/021; H04B 17/318; H04B 17/27
See application file for complete search history.

(56) References Cited

U.S. PATENT DOCUMENTS

| | | | |
|---|---|---|---|
| 8,248,210 B2* | 8/2012 | Nikitin | G06K 7/10079 340/10.1 |
| 2009/0303013 A1* | 12/2009 | Edgerton | G06K 7/0008 340/10.1 |
| 2016/0239753 A1* | 8/2016 | Loehlein | G06F 11/0721 |
| 2018/0293535 A1* | 10/2018 | Christopher | G06Q 10/087 |
| 2020/0104333 A1* | 4/2020 | Xu | G06F 16/9537 |
| 2020/0282287 A1* | 9/2020 | Kim | G01C 3/08 |

* cited by examiner

*Primary Examiner* — Vernal U Brown
(74) *Attorney, Agent, or Firm* — Winston Hsu

(57) ABSTRACT

A method for locating a wireless tag includes transmitting a first set of signals by the wireless tag in a first time period, receiving the first set of signals by a base station of at least one base station during the first time period, generating a first set of distance values according to the first set of signals received by the base station, generating a first subset of distance values by removing at least a maximum distance value and a minimum distance value from the first set of distance values, obtaining a first distance between the wireless tag and the base station by averaging the first subset of distance values, and identifying a first location of the wireless tag according to at least one first distance.

16 Claims, 10 Drawing Sheets

WIRELESS TAG LOCATION SYSTEM AND METHOD THEREOF

BACKGROUND OF THE DISCLOSURE

1. Field of the Disclosure

The present disclosure is related to a wireless tag location system and method, especially to an indoor wireless tag location system and method with increased location efficiency.

2. Description of the Prior Art

Locating and tracking an object in an indoor space or a confined area is typically referred to as indoor location. An indoor location system is used for many applications such as locating or giving directions to tourists in an exhibition, locating doctors, nurses, medical equipment in a hospital, or locating personnel and machines in a large factory.

Wireless location systems are typically based on inertial navigation wherein these systems generally incorporate technologies such as global positioning system (GPS) based tracking, Wi-Fi tracking using Radio Frequency communication and typically use sensors such as gyroscopes, accelerometers and electromagnetic field sensors for location detection. Typically a wireless communication tag carried by a person sends out wireless signals and the signals are received by base stations placed at different locations within the indoor environment. Some systems use beacons embedded in wireless communications devices that transmit signals received by Wi-Fi receivers placed at different locations in the indoor environment. This can be used to locate the person by mapping the indoor environment or via the GPS. Other systems use RFID tags which operate by the same principle.

While wireless location systems known in the art can locate and track people carrying tags, it needs a simple, accurate and robust method of locating moving tags, especially in emergency situations such as fire or earthquake, to evacuate people from the indoor environment. Thus there is a need for an improved system and method for fast and accurate locating of people in an indoor environment.

SUMMARY OF THE DISCLOSURE

The embodiment provides a method for locating a wireless tag. The method includes transmitting a first set of signals by the wireless tag in a first time period, receiving the first set of signals by a base station of at least one base station during the first time period, generating a first set of distance values according to the first set of signals received by the base station, generating a first subset of distance values by removing at least a maximum distance value and a minimum distance value from the first set of distance values, obtaining a first distance between the wireless tag and the base station by averaging the first subset of distance values, and identifying a first location of the wireless tag according to at least one first distance.

The embodiment provides a wireless tag location system. The wireless tag location system includes a wireless tag for transmitting a first set of wireless signals in a first time period, a base station of at least one base station for receiving the first set of wireless signals during the first time period, and a processor for generating a first set of distance values according to the first set of signals received by the base station, generating a first subset of distance values by removing at least a maximum distance value and a minimum distance value from the first set of distance values, obtaining a first distance between the wireless tag and the base station by averaging the first subset of distance values, and identifying a first location of the wireless tag according to at least one first distance.

These and other objectives of the present disclosure will no doubt become obvious to those of ordinary skill in the art after reading the following detailed description of the embodiment that is illustrated in the various figures and drawings.

FIG . 2C is a diagram illustrating signal coverage of three base stations.

Figure 1:
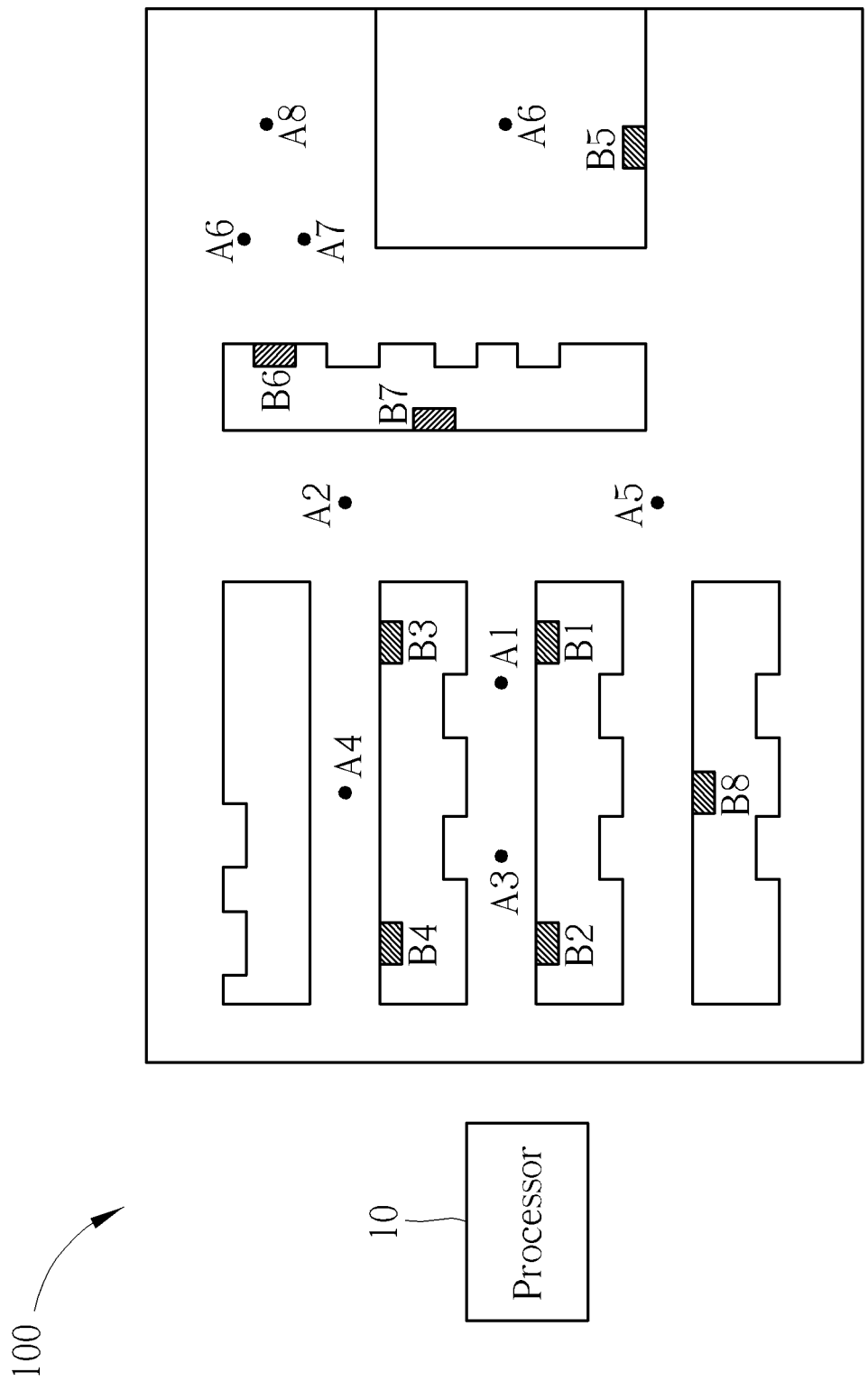
FIG. 1 is a diagram of an indoor wireless tag location system of an embodiment.
Figure 3A:
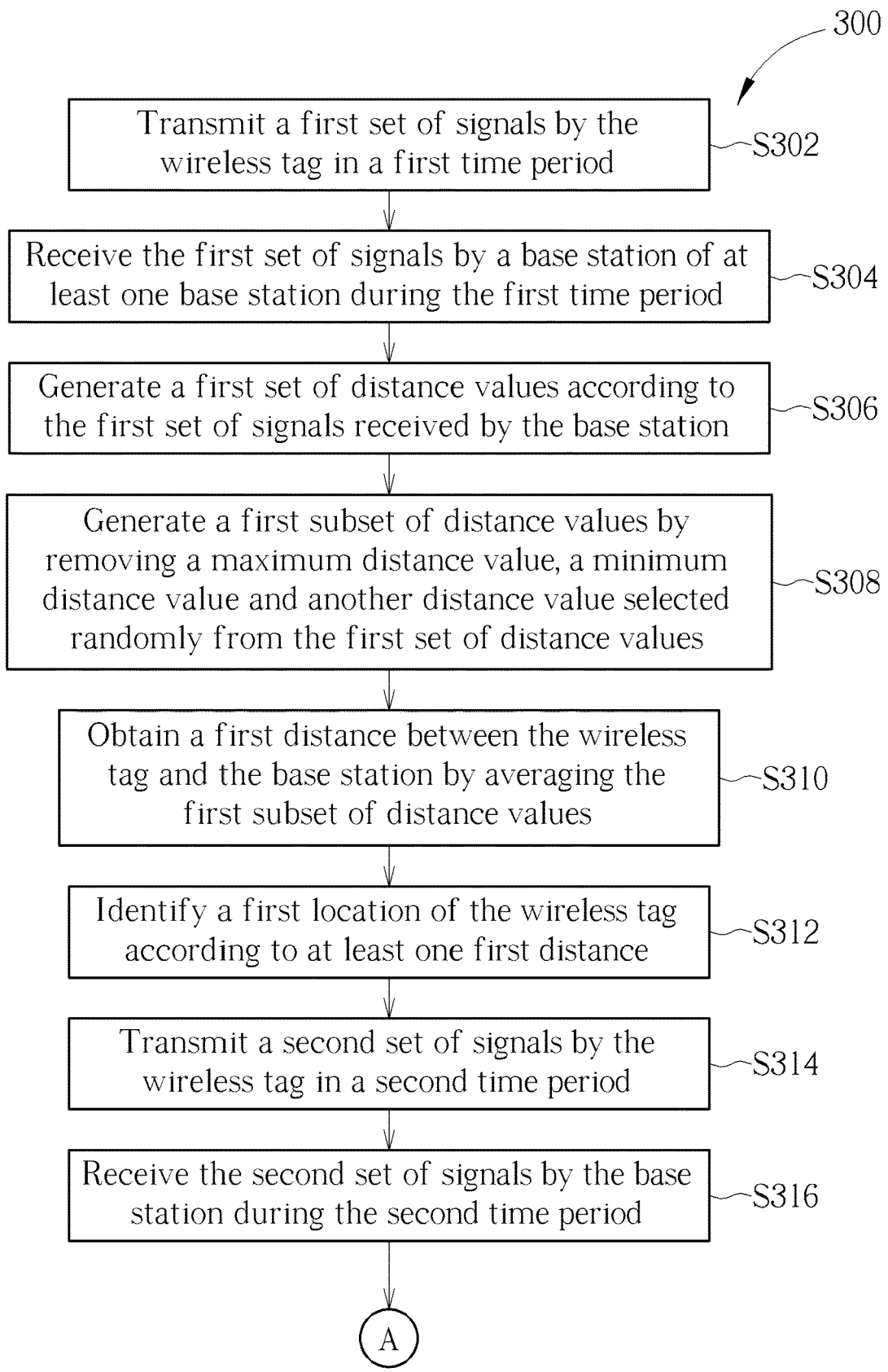
Figure 3B:
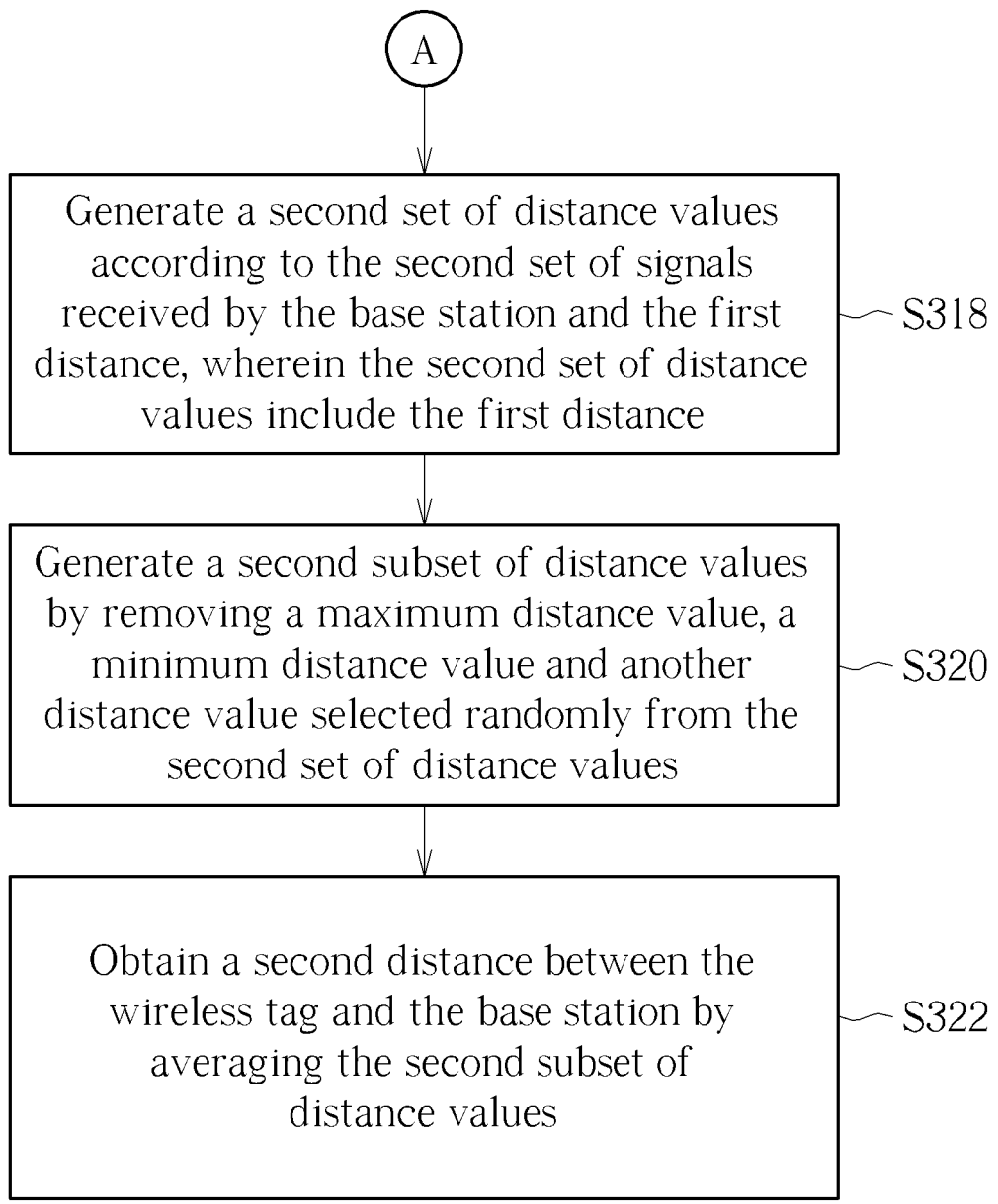

FIG. 3A and 3B are a flow chart of the method for locating a wireless tag using the wireless tag location system of FIG. 1.

Figure 4:
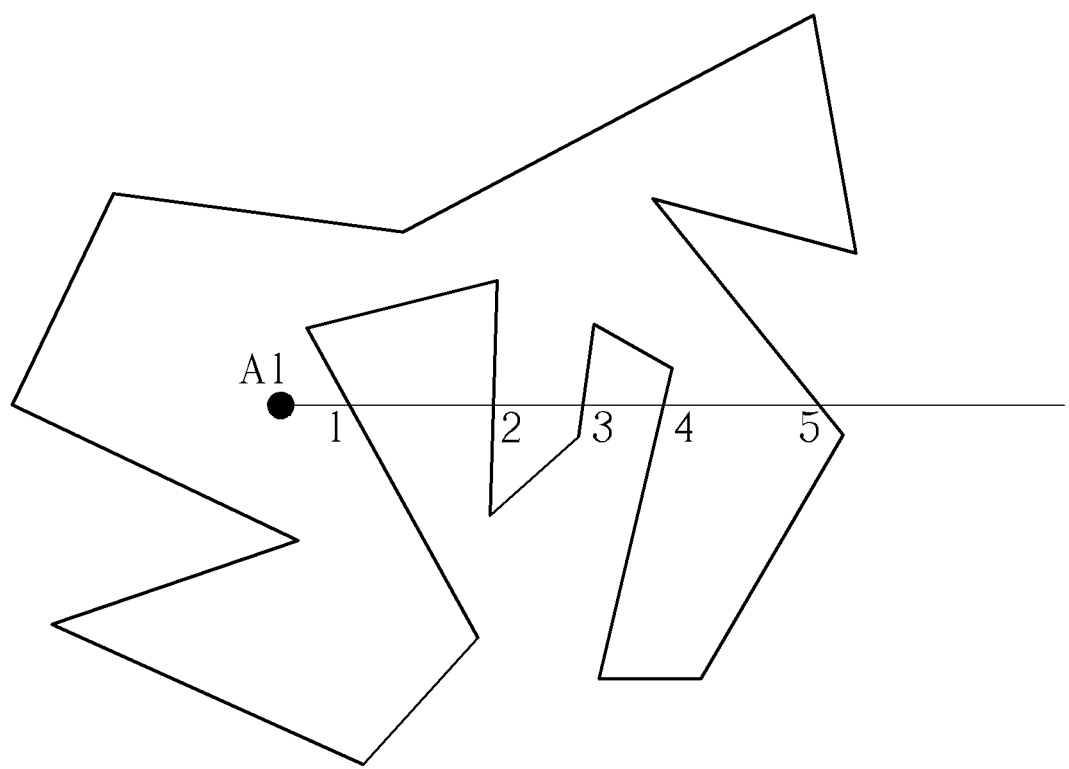

FIG. 4 is a diagram illustrating a boundary of an unauthorized area generated by the wireless tag location system of FIG. 1.

Figure 5:
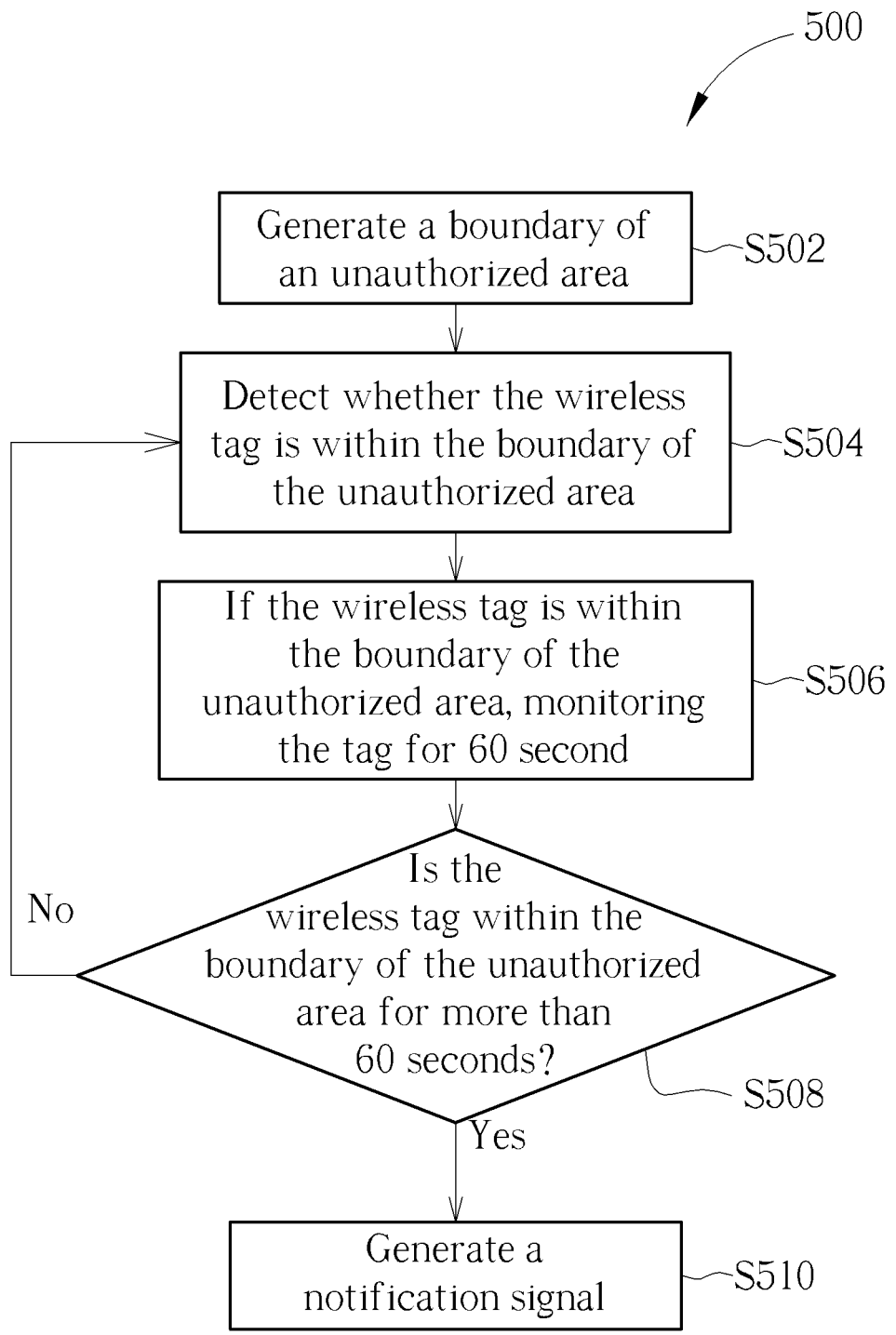

FIG. 5 is a flowchart of the method for electronic fence using the wireless tag location system of FIG. 1.

Figure 6:
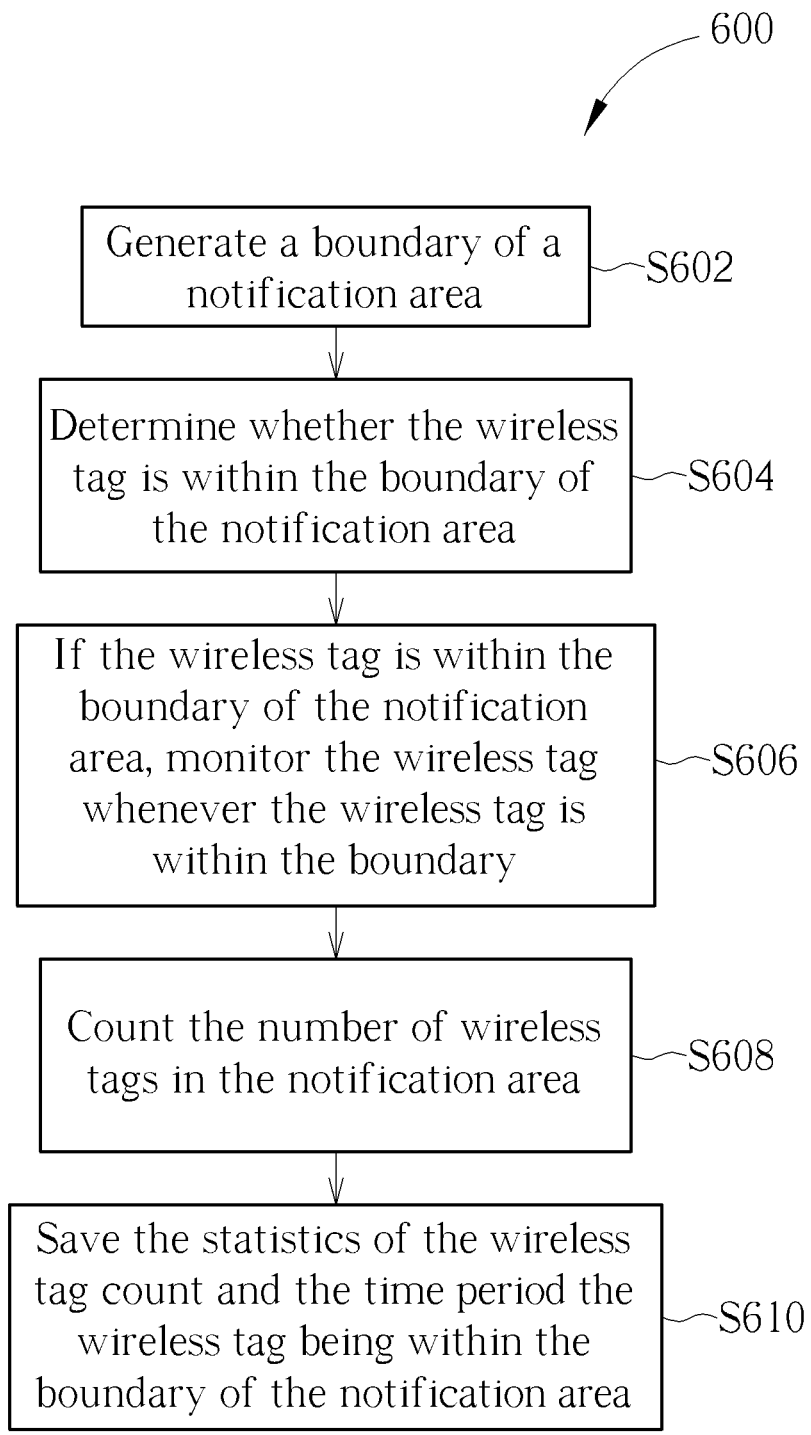

FIG. 6 is a flowchart of the method for lighting control using the wireless tag location system of FIG. 1.

Figure 7:
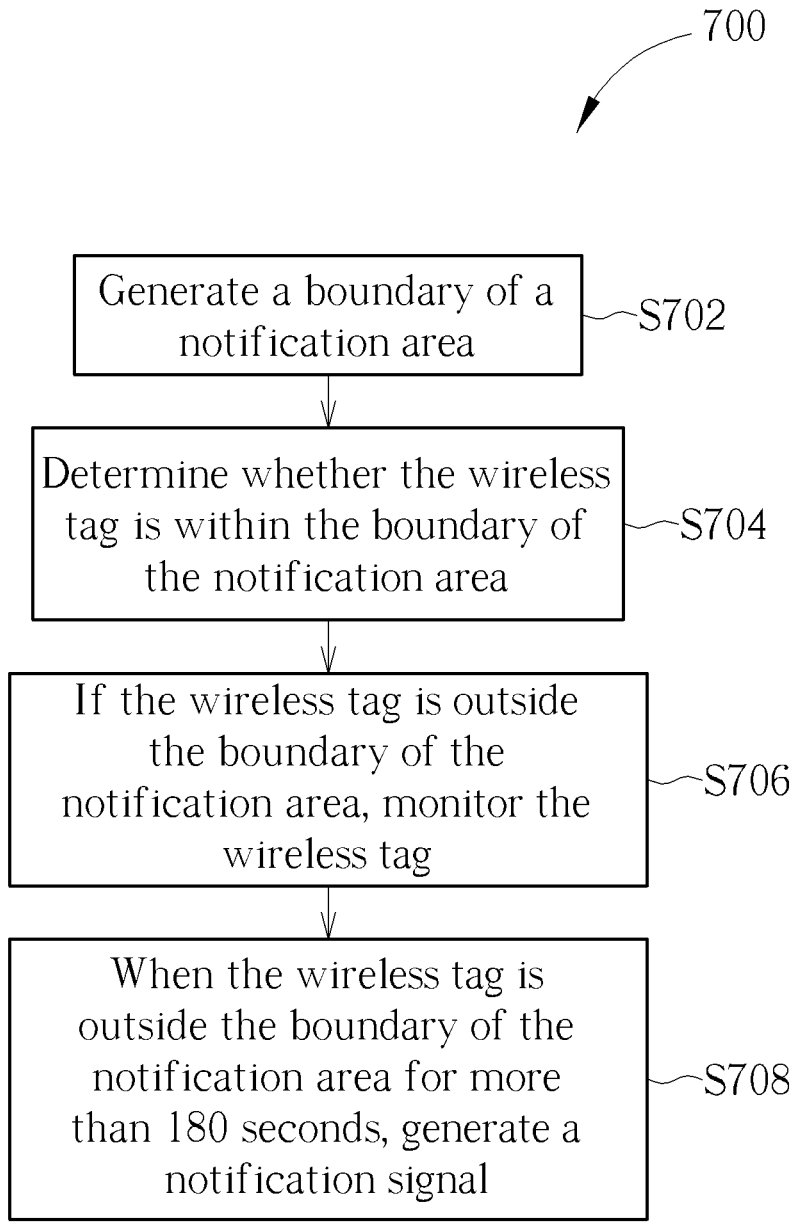

FIG. 7 is a flowchart of the method for dispatch control using the wireless tag location system FIG. 1.

DETAILED DESCRIPTION

Reference now be made in detail to exemplary embodiments, which are illustrated in the accompanying drawings in order to understand and implement the present disclosure and to realize the technical effect. It can be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in contact with an embodiment, it would be within the knowledge of a person skilled in the pertinent art to effect such feature, structure or characteristic in contact with other embodiments whether or not explicitly described.

The present disclosure may be understood by reference to the following detailed description, taken in conjunction with the drawings as described below, and for purposes of illustrative clarity and being easily understood by the readers, various drawings of this disclosure may be simplified, and the elements in various drawings may not be drawn to scale. In addition, the number and dimension of each element shown in drawings are just illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function. In the following description and in the claims, the terms "comprise", "include" and "have" are used in an open-ended fashion, and thus should be interpreted to mean "include, but not limited to . . . ".

The direction terms used in the following embodiment such as up, down, left, right, in front of or behind are just the directions referring to the attached figures. Thus, the direction terms used in the present disclosure are for illustration, and are not intended to limit the scope of the present disclosure. It should be noted that the elements which are specifically described or labeled may exist in various forms for those skilled in the art. Besides, when a layer is referred to as being "on" another layer or substrate, it may be directly on the other layer or substrate, or may be on the other layer or substrate, or intervening layers may be included between other layers or substrates.

Besides, relative terms such as "lower" or "bottom", and "higher" or "top" may be used in embodiments to describe the relative relation of an element to another element labeled in figures. It should be understood that if the labeled device is flipped upside down, the element in the "lower" side may be the element in the "higher" side.

The ordinal numbers such as "first", "second", etc. are used in the specification and claims to modify the elements in the claims. It does not mean that the required element has any previous ordinal number, and it does not represent the order of a required element and another required element or the order in the manufacturing method. The ordinal number is just used to distinguish the required element with a certain name and another required element with the same certain name.

It should be noted that the technical features in different embodiments described in the following may be replaced, recombined, or mixed with one another to constitute another embodiment without departing from the spirit of the present disclosure.

FIG. 1 is a diagram of a wireless tag location system 100 of an embodiment. The wireless tag location system 100 includes a plurality of wireless tag A1 to A8, a plurality of base stations B1 to B8, and a processor 10. Each wireless tag can transmit a set of wireless signals in a time period. Each base station can receive wireless signals transmitted from the wireless tags A1 to A8.

Suppose the wireless tag A1 transmits a first set of wireless signals in a first time period within the coverage of the base station B1, the processor 10 can generate a first set of distance values according to the wireless signals received by the base station B1 and generate a first subset of distance values by removing a maximum distance value, a minimum distance value and another distance value selected randomly from the first set of distance values. The processor 10 can also calculate a first distance between the wireless tag A1 and the base station B1 by averaging the subset of distance values, and identify the approximate location of the wireless tag A1 according to the first distance.

For example, the wireless tag A1 transmits a first set of signals during the first time period of 7 seconds to the base station B1. Then, the processor 10 can generate a set of distance values {3, 6, 5, 9, 7, 20, 8} from the signal received by the base station B1. A subset of distance values can be obtained by removing the maximum distance value 20, the minimum distance value 3 and another distance value 8 selected randomly from the set of distance values. Then, by averaging the subset of distance values {6, 5, 9, 7}, a first distance of 6.75 can be obtained. The location of the wireless tag A1 according to the first distance can be approximately identified using Received Signal Strength Indicator (RSSI), Angle of Arrival (AOA), Time of Arrival (TOA) and/or Time Difference of Arrival (TDOA). By removing the maximum, minimum and a randomly selected distance values from the set of distance values, the system can generate a more accurate distance, therefore it can obtain a more accurate wireless tag location.

Assuming the wireless tag A1 is moved to another location still within the signal coverage of the base station B1. After a rest period of 3 seconds, for example, the wireless tag A1 transmits a second set of signals during the second time period of 7 seconds to the base station B1. Then, the processor 10 can generate a set of distance values {6.75, 4, 7, 6, 10, 8, 15} from the signal received by the base station B1. This set of distance values includes the first distance 6.75. A subset of distance values would be generated by removing the maximum distance value 15, the minimum distance value 4 and another distance value 7 selected randomly from the second set of distance values. Then, by averaging the subset of distance values {6.75, 6, 10, 8}, a second distance 7.69 can be obtained. The location of the wireless tag A1 according to the second distance can be approximately identified using Received Signal Strength Indicator (RSSI), Angle of Arrival (AOA), Time of Arrival (TOA) and/or Time Difference of Arrival (TDOA). By removing the maximum, minimum and a randomly selected distance values, and including the first distance, the system can generate a more accurate second distance, therefore it can obtain a more accurate wireless tag location. It should be noted that the rest period can be any length of time, not limited to 3 seconds. Also, the first time period and the second time period can be any length of time, not limited to 7 seconds.

The rest period between the first time period and the second time period can be adjusted according to a movement of the wireless tag and a base station signal coverage. In an embodiment, for example, if the wireless tag A1 moves continuously, the wireless tag A1 can transmit the wireless signal every 1 second. If the wireless tag A1 stays in a location for more than 10 seconds, the wireless tag A1 can adjust the reset period to transmit the wireless signal every 3 seconds. If the wireless tag A1 stays in a location for more than 30 seconds, the wireless tag A1 can again adjust the rest period to transmit the wireless signal every 5 seconds. If the wireless tag A1 is moved to a location without any signal coverage from base stations, then the wireless tag A1 can adjust the rest period to transmit the signal every 30 seconds until receiving a response from a base station. This way can prolong the battery life of the wireless tag A1.

Figure 2A:
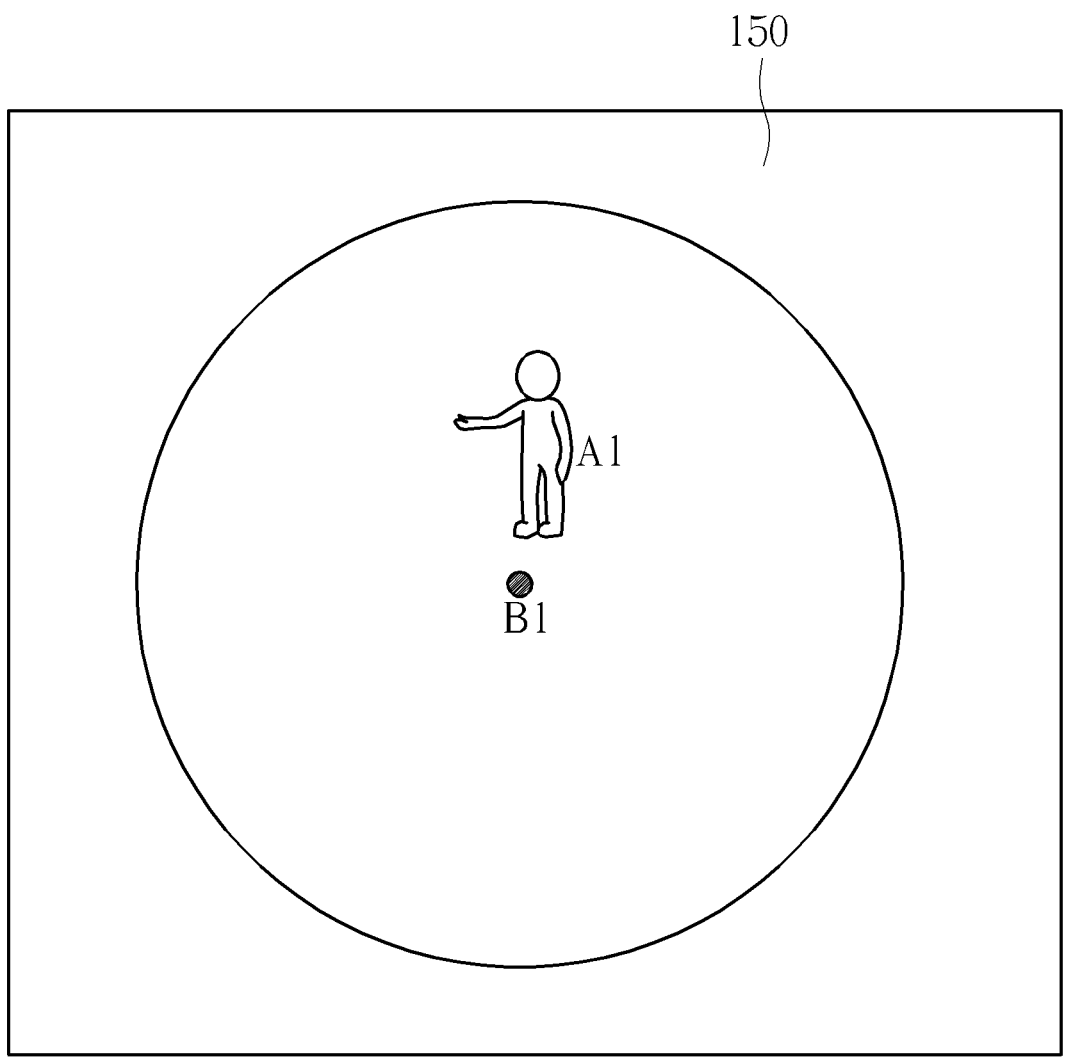
FIG. 2A is a diagram illustrating signal coverage of one base station.

FIG. 2A is a diagram illustrating signal coverage of one base station B1. This scenario applies to an environment where the base station B1 and the wireless tag A1 are in an isolated room 150. In this case, the location of the wireless tag A1 is set to be identified by the base station B1. The system can know that the wireless tag A1 is located within a predetermined signal coverage of the base station B1. For example, if the predetermined coverage is within 3 meters from the base station B1, the system would determine that the wireless tag A1 is located within 3 meters of radius from the base station B1. Thus the system can conclude that the wireless tag Al is in the isolated room 150. The base station B1 can update the location of the wireless tag A1 every 6 seconds, for example, but the time period between each update is not limited by the embodiment.

Figure 2B:
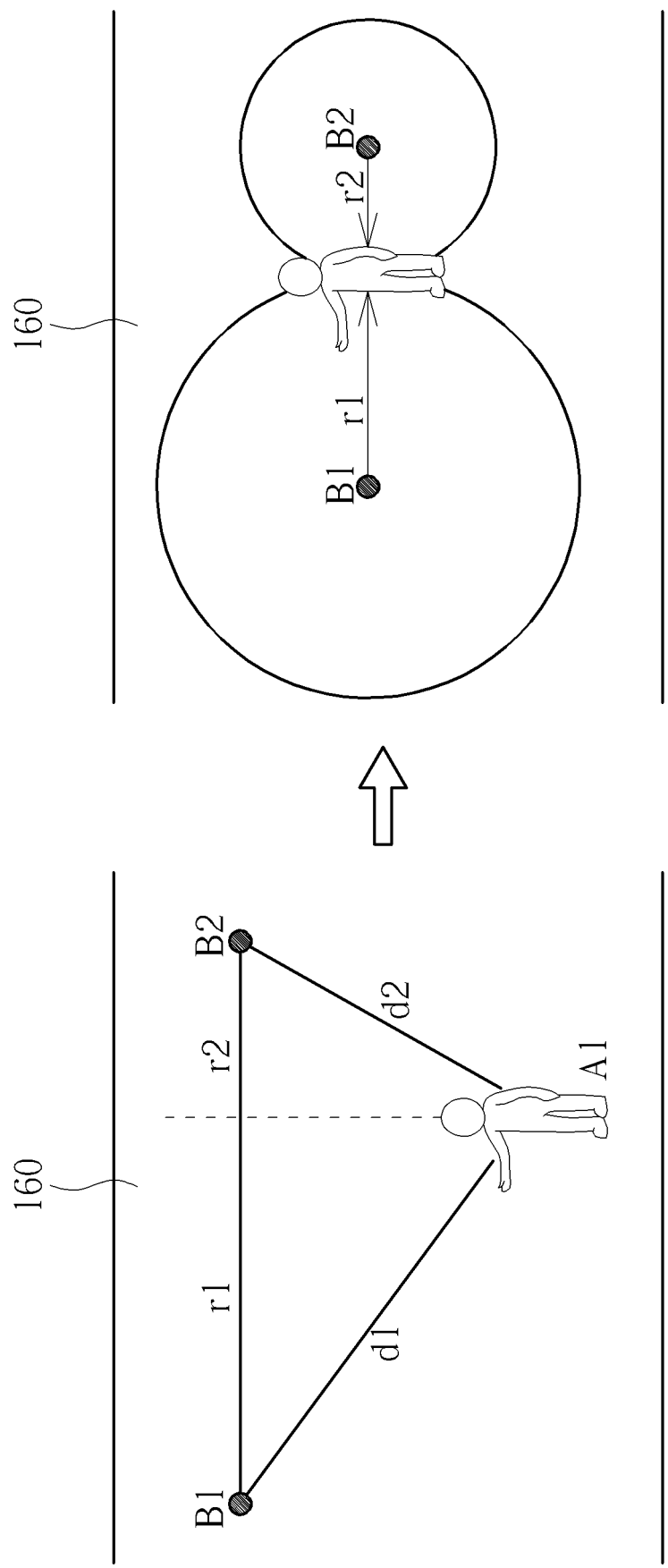
FIG. 2B is a diagram illustrating signal coverage of two base stations.

FIG. 2B is a diagram illustrating signal coverage of two base stations B1 and B2. This scenario applies to an environment where the wireless tag A1 is on a narrow aisle 160 between the base station Bl and the base station B2 and only the linear location of the wireless tag A1 needs to be identified. The system only needs to identify the linear distance proportion of the wireless tag A1 between the first base station B1 and the second base station B2 to get approximate location of the wireless tag The base station B1 and the base station B2 both receive signals from the wireless tag In this case, the location of the wireless tag A1 is set to be identified by the base station B1 and the base station B2. The base station B1 can obtain a distance d1 from base station B1 to the wireless tag Al. The base station B2 can obtain a distance d2 from base station B2 to the wireless tag In this case, the approximate location of the wireless tag A1 between the two base stations B1 and B2 is proportional to distances d1 and d2. The linear distance proportion r1 to the first base station B1 and the linear distance proportion r2 to the second base station B2 can be calculated from distances d1 and d2. By using this method, the linear location of the wireless tag A1 on the aisle 160 can be identified. The base station B1 and B2 can update the location of the wireless tag A1 every 3 seconds, for example, but the time period between each update is not limited by the embodiment.

Figure 2C:
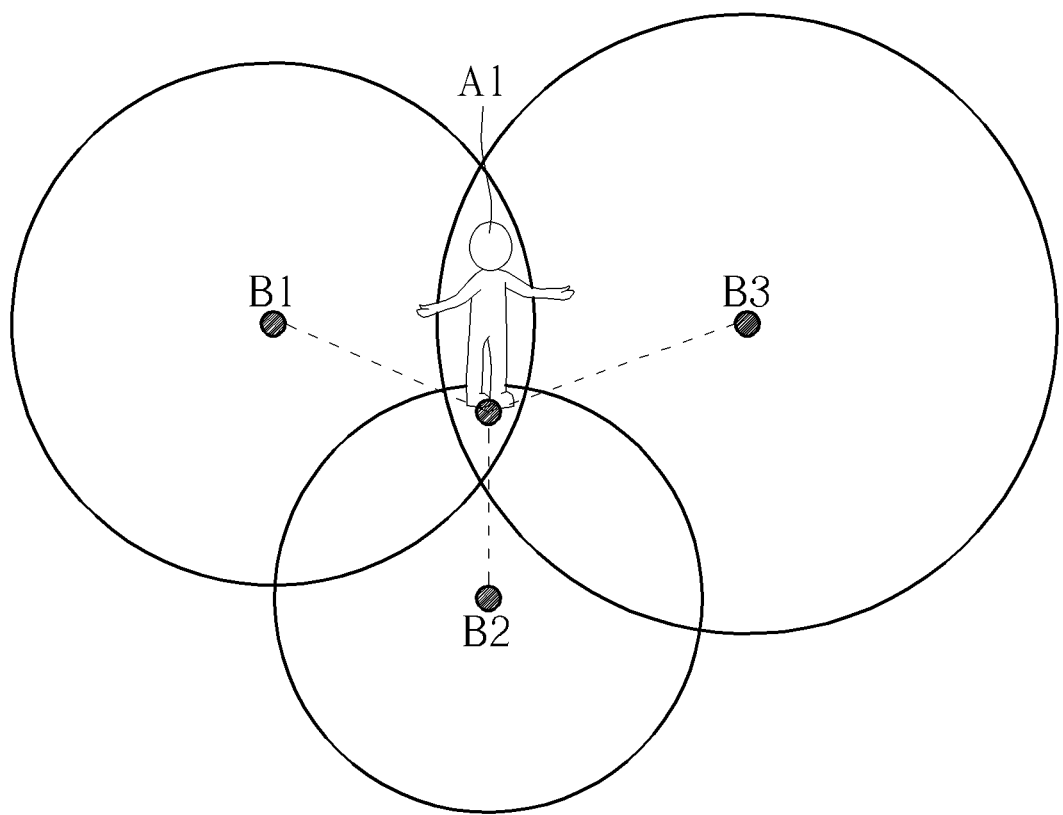

FIG. 2C is a diagram illustrating signal coverage of three base stations B1, B2 and B3. In addition to the base station B1 and B2, assuming the base station B3 also receives signals from the wireless tag A1, it can obtain the distance from base station B3 to the wireless tag A1. By using the distances from the wireless tag A1 to the base station B1, the base station B2 and the base station B3 respectively with triangulation positioning techniques, the location of the wireless tag A1 can be identified. The same technique can be applied to scenarios of signal coverage of more than three base stations. The base station B1, B2 and B3 can update the location of the wireless tag A1 every 1 second, for example, but the time period between each update is not limited by the embodiment.

In some embodiments, the location of the wireless tag A1 is identified based on an active type algorithm if the signal coverage of one of the base stations is an active type base station. The active type base station determines whether the wireless tag A1 is identified using one base station method, two base stations method or three base stations method described previously.

In this embodiment, the wireless tag is an Ultra Wide Band (UWB) tag. But in other embodiments, other wireless technology such as Radio Frequency Identification (RFID) or Global Positioning System (GPS) can also be applied.

The above-mentioned process can quickly and accurately locate wireless tags with minimal base station placement.

FIGS. 3A and 3B are a flow chart of the method 300 for locating a wireless tag using the wireless tag location system 100. The method includes the following steps:

S302: Transmit a first set of signals by the wireless tag in a first time period;

S304: Receive the first set of signals by a base station of at least one base station during the first time period;

S306: Generate a first set of distance values according to the first set of signals received by the base station;

S308: Generate a first subset of distance values by removing a maximum distance value, a minimum distance value and another distance value selected randomly from the first set of distance values;

S310: Obtain a first distance between the wireless tag and the base station by averaging the first subset of distance values;

S312: Identify a first location of the wireless tag according to at least one first distance;

S314: Transmit a second set of signals by the wireless tag in a second time period;

S316: Receive the second set of signals by the base station during the second time period;

S318: Generate a second set of distance values according to the second set of signals received by the base station and the first distance, wherein the second set of distance values include the first distance;

S320: Generate a second subset of distance values by removing a maximum distance value, a minimum distance value and another distance value selected randomly from the second set of distance values;

S322: Obtain a second distance between the wireless tag and the base station by averaging the second subset of distance values; and S324: Identify a second location of the wireless tag according to at the second distance.

FIG. 4 is a diagram illustrating a boundary of an unauthorized area generated by the wireless tag location system 100. When detecting the wireless tag within the boundary of the unauthorized area, the system 100 can generate a notification signal. Whether the wireless tag A1 being within the boundary can be determined by ray casting algorithm. A virtual line can be drawn far away outside from the boundary to the location of wireless tag Then the number of intersections of the virtual line with the edges of the boundary can be calculated. If the number of intersections is odd, then the wireless tag A1 is inside the boundary. Otherwise the wireless tag A1 is outside the boundary.

FIG. 5 is a flow chart of the method 500 for an electronic fence using the wireless tag location system 100. The method includes the following steps:

S502: Generate a boundary of an notification area;

S504: Determine whether the wireless tag is within the boundary of the notification area;

S506: If the wireless tag is within the boundary of the notification area, monitoring the tag for 60 seconds;

S508: Is the wireless tag within the boundary of the notification area for more than 60 seconds? If yes, go to S510; if not, go to S504;

S510: Generate a notification signal.

The notification area can be an unauthorized area. The notification signal can be a warning signal. Security measures of an indoor environment, such as a factory, can be enhanced in this way. It should be noted that the time period of the wireless tag being within the boundary before triggering the notification signal is not limited to 60 seconds.

FIG. 6 is a flow chart of the method 600 for lighting control using the wireless tag location system 100. The method includes the following steps:

S602: Generate a boundary of a notification area;

S604: Determine whether the wireless tag is within the boundary of the notification area;

S606: If the wireless tag is within the boundary of the notification area, monitor the wireless tag whenever the wireless tag is within the boundary;

S608: Count the number of wireless tags in the notification area; and

S610: Save the statistics of the wireless tag count and the time period the wireless tag being within the boundary of the notification area.

The statistics of the time period of the wireless tag being within the boundary of the notification area and of the wireless tag count can be used for automatic lighting control. For example, the information can be used to determine the turn-on and turn-off time to save resources.

FIG. 7 is a flow chart of the method 700 for dispatch control using the wireless tag location system 100. The method includes the following steps:

S702: Generate a boundary of a notification area;

S704: Determine whether the wireless tag is within the boundary of the notification area;

S706: If the wireless tag is outside the boundary of the notification area, monitor the wireless tag; and S708: When the wireless tag is outside the boundary of the notification area for more than 180 seconds, generate a notification signal.

The notification area can be a dispatch area. The notification signal can be a warning signal. Security measures of an indoor environment, such as a factory, can be enhanced in this way.

In summary, the embodiment provides a wireless tag location system and method to locate wireless tags in a fast and accurate manner. In case of emergency situations such as fire or earthquake, the wireless tag location system can help evacuate people from the indoor environment efficiently and quickly, therefore increasing the safety and security of the working environment.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for locating a wireless tag, comprising:
    transmitting a first set of signals by the wireless tag in a first time period;
    receiving the first set of signals by a base station of at least one base station during the first time period;
    generating a first set of distance values according to the first set of signals received by the base station;
    generating a first subset of distance values by removing at least a maximum distance value and a minimum distance value from the first set of distance values;
    obtaining a first distance between the wireless tag and the base station by averaging the first subset of distance values;
    identifying a first location of the wireless tag according to at least one first distance;
    generating a rest period following directly after the first period;
    transmitting a second set of signals by the wireless tag in a second time period following the rest period;
    receiving the second set of signals by the base station during the second time period;
    generating a second set of distance values according to the second set of signals received by the base station and the first distance, wherein the second set of distance values comprises the first distance;
    generating a second subset of distance values by removing at least a maximum distance value and a minimum distance value from the second set of distance values;
    obtaining a second distance between the wireless tag and the base station by averaging the second subset of distance values; and
    identifying a second location of the wireless tag according to at least one second distance;
    wherein the rest period between the first time period and the second time period is determined according to the movement of the wireless tag and a signal coverage of the base station.

2. The method of claim 1, wherein generating the first subset of distance values by removing at least the maximum distance value and the minimum distance value from the first set of distance values comprises:
    generating the first subset of distance values by removing the maximum distance value, the minimum distance value and another distance value selected randomly from the first set of distance values.

3. The method of claim 1, generating the second subset of distance values by removing at least the maximum distance value and the minimum distance value from the second set of distance values comprises:
    generating the second subset of distance values by removing the maximum distance value, the minimum distance value and another distance value selected randomly from the second set of distance values.

4. The method of claim 1, wherein the first location of the wireless tag is identified based on an active type algorithm if one of the at least one base station is an active type base station.

5. The method of claim 1, wherein the wireless tag is an Ultra Wide Band (UWB) tag.

6. The method of claim 1, wherein the first location of the wireless tag according to at least one first distance value is identified using Received Signal Strength Indicator (RSSI), Angle of Arrival (AOA), Time of Arrival (TOA) and/or Time Difference of Arrival (TDOA).

7. The method of claim 1, further comprising generating a boundary of a notification area and determining whether the wireless tag is within the boundary of the notification area.

8. The method of claim 7, further comprising generating a notification signal when determining the wireless tag is within the boundary of the notification area.

9. A wireless tag location system comprising:
    a wireless tag configured to transmit a first set of wireless signals in a first time period and transmit a second set of wireless signals in a second time period following the rest period;
    a base station of at least one base station configured to receive the first set of wireless signals during the first time period and receive the second set of wireless signals during the second time period; and
    a processor configured to:
        generate a first set of distance values according to the first set of signals received by the base station;
        generate a first subset of distance values by removing at least a maximum distance value and a minimum distance value from the first set of distance values;
        obtain a first distance between the wireless tag and the base station by averaging the first subset of distance values;
        identify a first location of the wireless tag according to at least one first distance;

generate a rest period following directly after the first period;

generate a second set of distance values according to the second set of signals received by the base station and the first distance, wherein the second set of distance values comprises the first distance;

generate a second subset of distance values by removing at least a maximum distance value and a minimum distance value from the second set of distance values; and obtain a second distance between the wireless tag and the base station by averaging the second subset of distance values; and identify a second location of the wireless tag according to at least one second distance;

wherein the rest period between the first time period and the second time period is determined according to the movement of the wireless tag and a signal coverage of the base station.

10. The system of claim 9, wherein the first subset of distance values is generated by removing the maximum distance value, the minimum distance value and another distance value selected randomly from the first set of distance values.

11. The system of claim 9, wherein the second subset of distance values is generated by removing the maximum distance value and the minimum distance value of the second set of distance values and another distance value selected randomly from the second set of distance values.

12. The system of claim 9, wherein the first location of the wireless tag is identified based on an active type algorithm if one of the at least one base station is an active type base station.

13. The system of claim 9, wherein the wireless tag is an Ultra Wide Band (UWB) tag.

14. The system of claim 9, wherein the first location of the wireless tag is identified using Received Signal Strength Indicator (RSSI), Angle of Arrival (AOA), Time of Arrival (TOA) and/or Time Difference of Arrival (TDOA).

15. The system of claim 9, wherein the processer is further configured to generate a boundary of a notification area and determining whether the wireless tag is within the boundary of the notification area.

16. The system of claim 15, wherein the processer is further configured to generate a notification signal when determining the wireless tag is within the boundary of the notification area.

* * * * *